F. B. HERZOG, DEC'D.
H. HERZOG, EXECUTRIX.
ELECTRIC SIGNALING APPARATUS.
APPLICATION FILED NOV. 5, 1907.
1,154,184.
Patented Sept. 21, 1915.
8 SHEETS—SHEET 5.
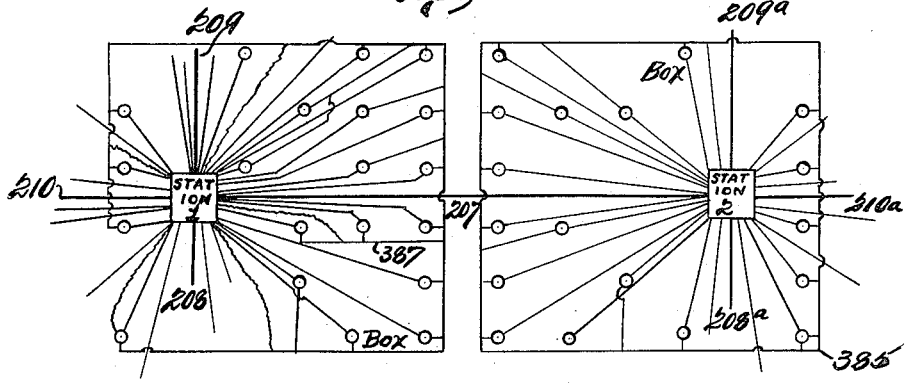
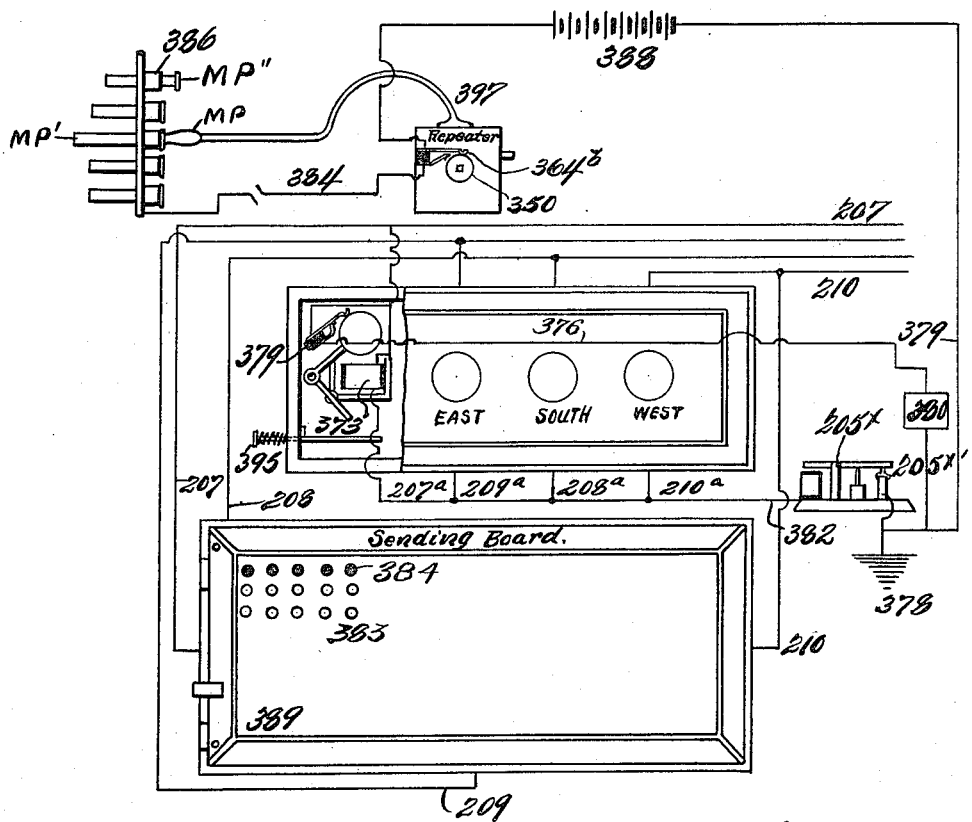

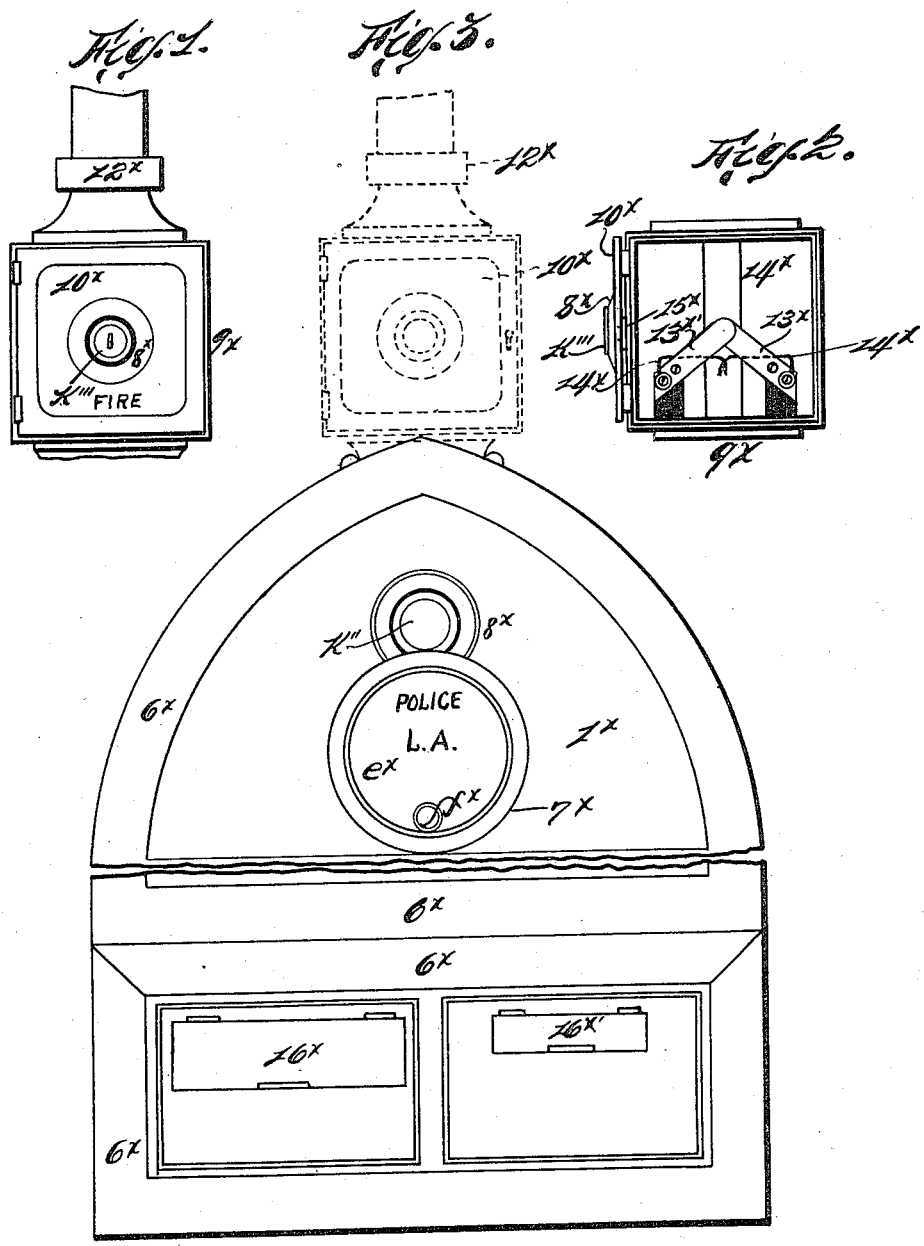

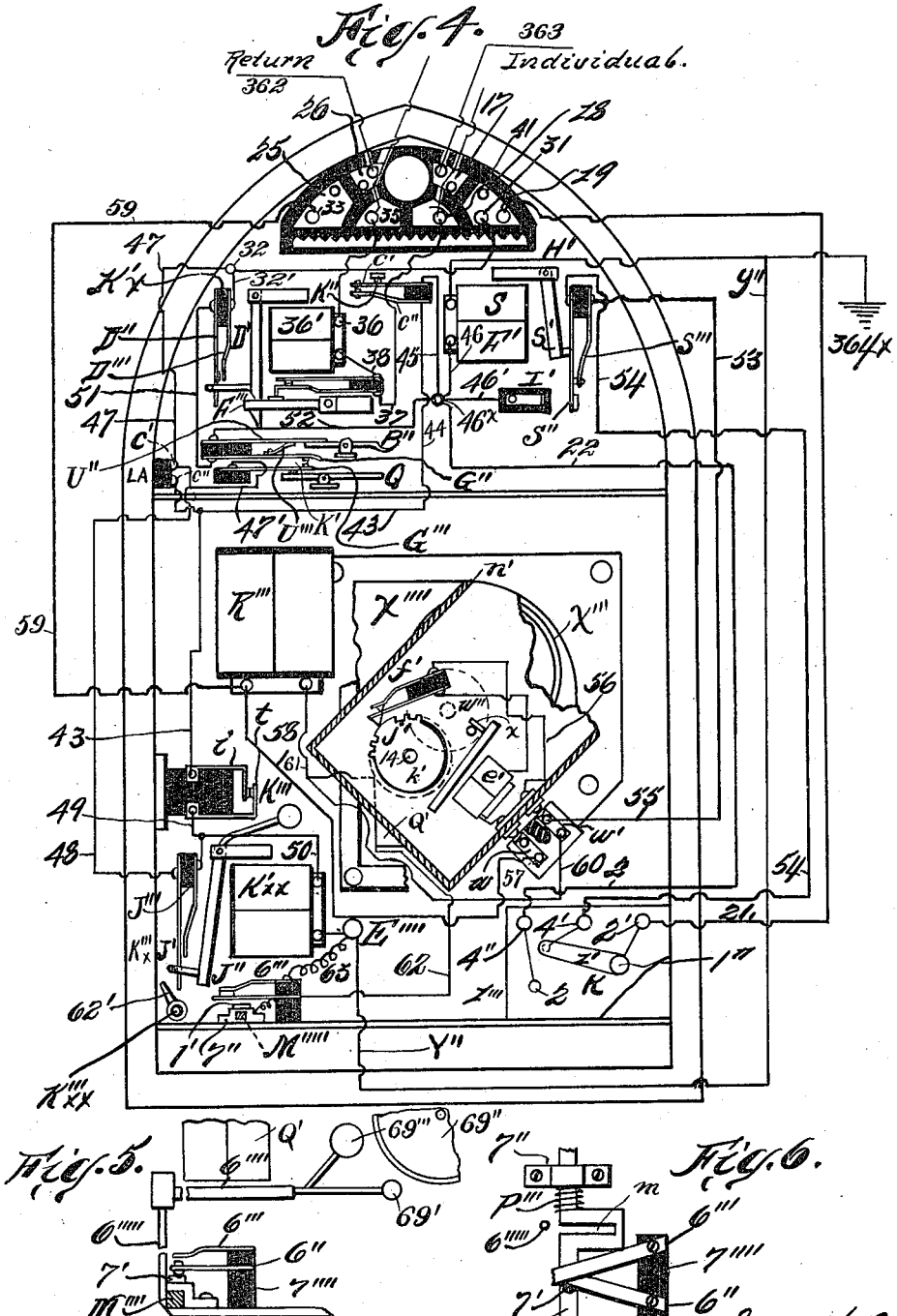

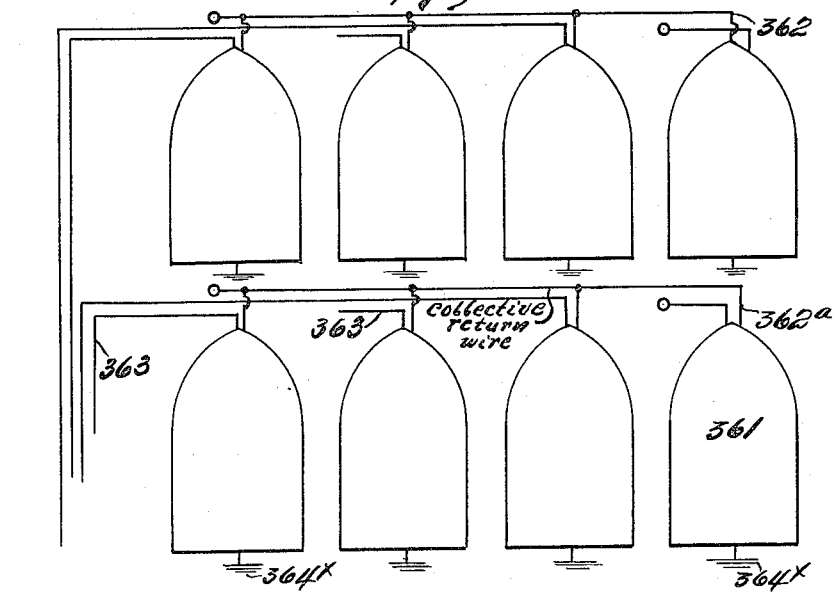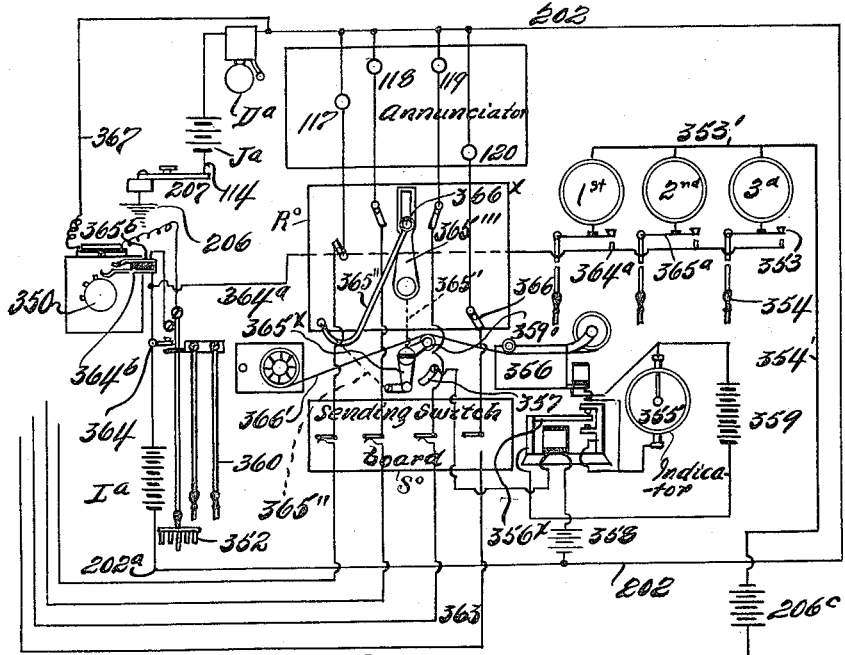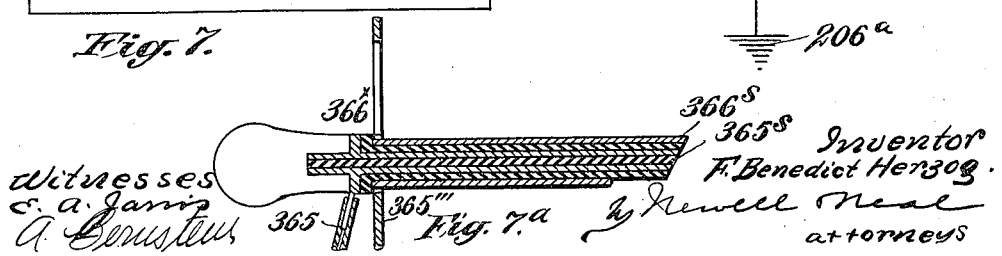

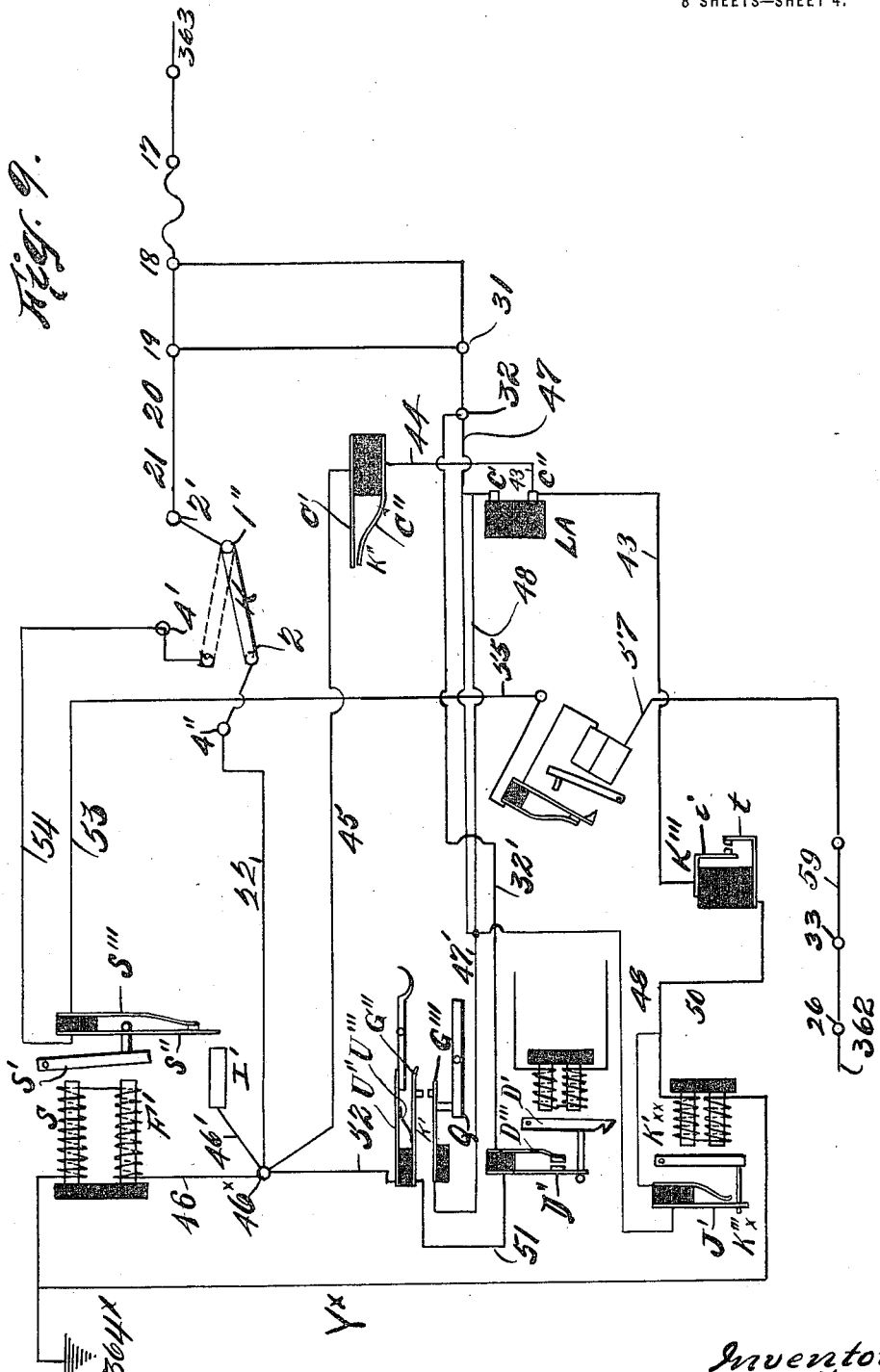

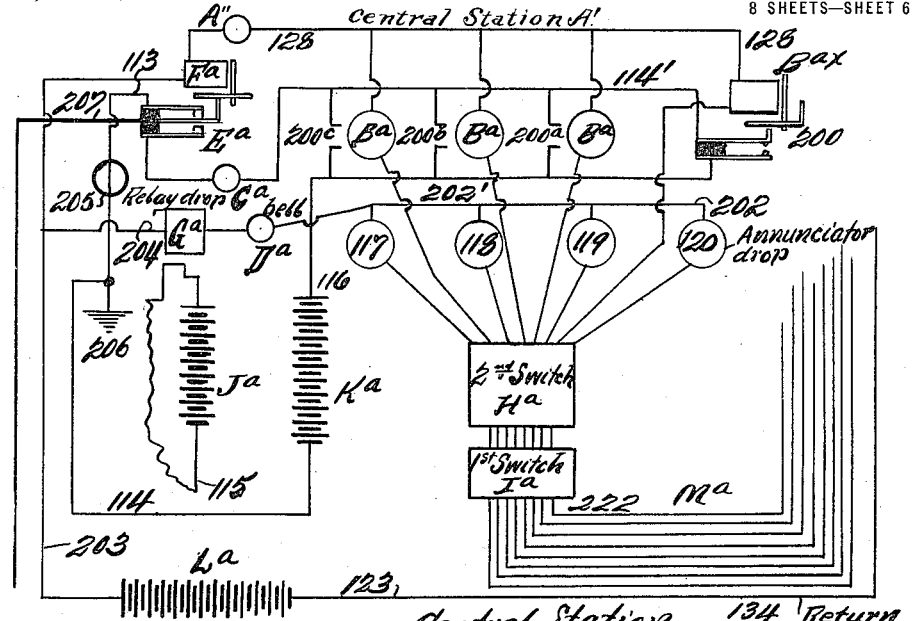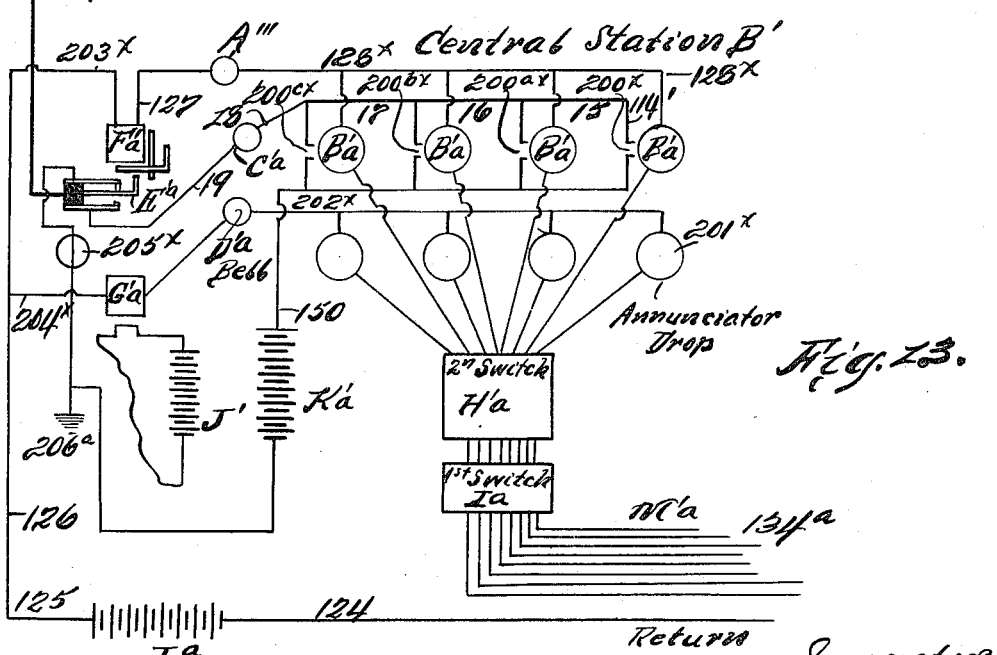

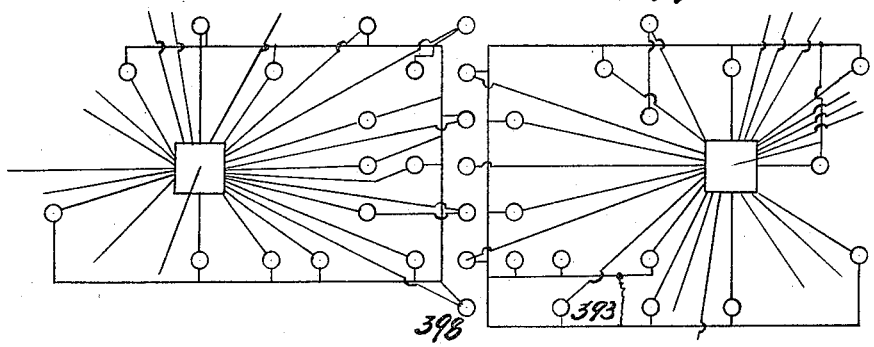

F. B. HERZOG, DEC'D.
H. HERZOG, EXECUTRIX.
ELECTRIC SIGNALING APPARATUS.
APPLICATION FILED NOV. 5, 1907.
1,154,184.
Patented Sept. 21, 1915.
8 SHEETS—SHEET 8.
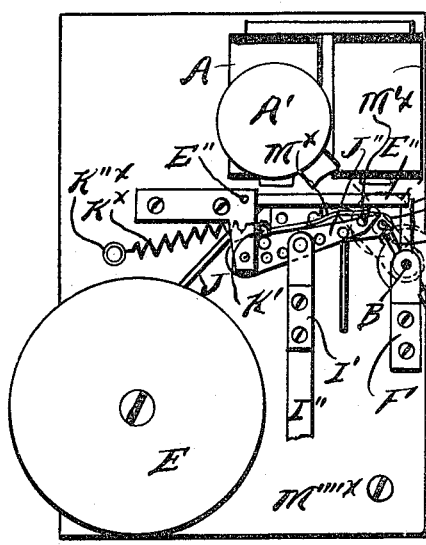
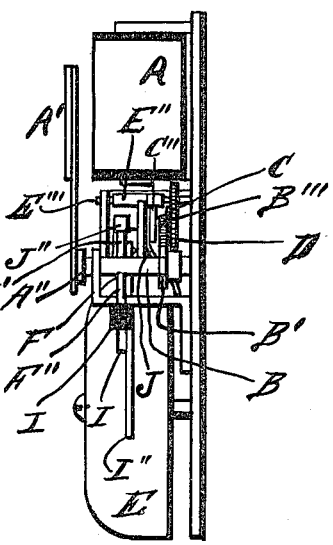
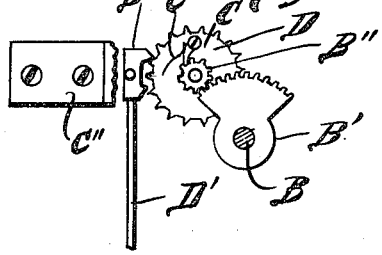
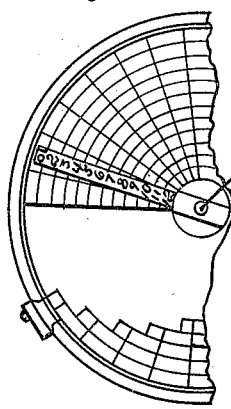

UNITED STATES PATENT OFFICE.

FELIX BENEDICT HERZOG, OF NEW YORK, N. Y.; HENRIETTA HERZOG EXECUTRIX OF SAID FELIX BENEDICT HERZOG, DECEASED.

ELECTRIC SIGNALING APPARATUS.

1,154,184.     Specification of Letters Patent.     Patented Sept. 21, 1915.

Original application filed July 12, 1889, Serial No. 317,369. Divided and this application filed November 5, 1907. Serial No. 400,898.

*To all whom it may concern:*

Be it known that I, FELIX BENEDICT HERZOG, a citizen of the United States, residing at New York, county and State of New York, have invented certain new and useful Improvements in Electric Signaling Apparatus, of which the following is a specification.

My invention relates to electric signaling, and has special reference to the various apparatus and methods used in cities for the purpose of fire and police telegraphy, although, as a whole, it may be used for various other purposes, as may also the various parts and elements which make up the system. The system is explained with special reference to use in a city in which the police or fire departments comprise two or more geographical divisions called "precincts."

In its fullest embodiment it consists of the following elements, all coöperating to form a harmonious whole, and separately useful to the extent of their availability. Firstly: two or more precincts, each provided with a central station and several outlying stations, the outlying stations being called "street-boxes." Secondly: means whereby street-boxes which are situated on or near the border line or lines, between two or more such precincts, may either signal more or less directly to the nearer of the two precinct stations, even if for some purposes they are considered as belonging to the more distant precinct station, or they may signal at the same time to two or more of such central stations simultaneously. Thirdly: means whereby, either in addition to such simultaneous signaling from the street-box, or as an alternative thereto, the central station of an adjoining precinct may know that a box belonging to an adjoining precinct and near the border line, has signaled. Fourthly: means whereby a street station box may be used as an intermediate or central station, with reference to outlying stations placed in neighboring houses, or similar locations called "sub-stations." Fifthly: the various elements in the shape of transmitters, receivers, adjunct, and circuit connections, contributing to secure the general results set forth in the foregoing.

The general type of the organization of the street boxes combined with one central station and the auxiliary sub-station has been illustrated in the application of Herzog and others filed prior to the filing date of the application, of which the present is a division, and subsequently patented as 808,087 and various parts referred to in the present case are shown and described at length therein; and for this reason it has been considered useless to add to the complexity of the present case by repeating the same.

These being among the objects of the present invention, the same consists of certain features of construction and combinations of parts to be hereinafter described and then claimed with reference to the accompanying drawings illustrating desirable embodiments of the invention, and in which—

Figure 1 is an elevation of a suitable form of circuit-controller; Fig. 2 is a view showing the interior of the same; Fig. 3 is an elevation showing portions of the front door of the box shown in Fig. 4 and certain features coöperating with other features of the apparatus, the dotted lines at the upper part of the figure showing the circuit controller illustrated in Figs. 1 and 2 as mounted in a desirable location on the said box; Fig. 4 is a view of the interior of the preferred form of box, showing the arrangement of operating parts therein; Fig. 5 is a detail of some of the parts shown in Fig. 4; Fig. 6 is another view of the same detail, differently viewed; Fig. 7 shows the general circuit arrangement of a central station apparatus adapted to be connected with several sets of outlying street boxes; Fig. 7ª is a detail of one of the switch plugs. Fig. 8 shows two sets of such boxes, the individual wires of which are shown so that they would be continuations of the individual wires leading to Fig. 7, and hence Figs. 7 and 8 may be considered as one view; Fig. 9 is a diagrammatic view of the various circuits of a street box such as shown in Fig. 4, and as one individual wire (363) is shown, it may be considered as one of the group of four individual wires illustrated in Figs. 7 and 8; Fig. 10 shows generically the circuit connections of two adjoining precincts, together with the circuit connecting them; Fig. 11 shows various details at a central station; Figs. 12 and 13 together show the details of the coöperating apparatus at the central stations of two adjoining precincts, and these figures may be considered as a single illustrative diagram; Figs. 14, 15, 16 and 17 show various modifications of the connections between two central stations of adjoining precincts; Fig. 18 is a front view; Fig. 19 a side elevation of the receiving apparatus at a central station; Fig. 20 a front view of a detail of one of the parts of the receiving apparatus at a central station; Fig. 21 is a portion of the front face and coöperating pointer of the signal transmitter in use at the transmitting box.

*Street or sub-station signaling box.*—In order to simplify the explanation, the arrangement of the preferred form of street signaling box, as set forth in Fig. 4, will be first explained. This box provides for sending to the central station the following classes of alarms:—emergency alarms, to which immediate attention must be given; these comprise, (*a*), an alarm given by a key through a key-hole in the inclosing case or door; this key is usually spoken of as the citizen's key, although it is not limited to a key to be used by citizens; (*b*), an alarm given from any one of the sub-stations connected with the box; this is called the "sub-station" alarm; (*c*), an alarm given by means of apparatus accessible to all persons, and herein called the "local alarm"; (*d*), another alarm which may be given from the outside of the box, and which differs in its effect at the central station from that given by the citizen's key or local alarm; this will be called the "fire alarm," although it may also be used for calling an ambulance, and for various other purposes, according to the commercial requirements. In addition to these emergency alarms, all given when the door is closed, another class of simple signals may be given, and this is called the "notification," and produces a different effect at the central station from any of the others. In the description all of the above-specified alarms will, in general, be referred to as being produced by the closure or break of several circuits, although, in some instances, instead of such simple closure or break, automatic mechanism may be added to produce a more or less complete series of such closures or breaks, arranged in groups corresponding to the characteristic of ordinary fire alarm telegraphy, or in various other ways. In addition to the manner of transmitting alarms, above specified, each box comprises a signal transmitter, organized to transmit variable signals, and preferably of the type called "latent signal transmitter," or "Teleseme," and generically shown in Patent No. 289,834. The variety of this character of transmitter, which it is preferred to use, enables the transmitting operator to set a signal so that subsequent operation from the central station will release it, and in order to enable the central operator to know that a message is set ready to be released, an additional simple signal is given him, which notifies him of this fact, and this signal is spoken of herein as the "notification signal," already referred to. This variable signal transmitter is substantially like that shown in patent #573,591, being constructed as follows: A box $n'$ (see Fig. 4) contains suitable clock-work, including a central spindle 14 supporting the circuit-wheel $k'$, and said wheel operates a wheel $w''$ having a pin engaging with a pivoted armature coöperating with magnet $e'$, and in series with this magnet is the double-contact brush $f'$. Over the part shown is placed a dial (as shown in Fig. 21), which comprises indications arranged in columns radiating from the center. On the shaft which supports the circuit-wheel $k'$, and which protrudes through the dial, is a sleeve, within which may be pushed in and out the pointer-arm bearing the figures shown. The words in each column correspond in number with a series of steps, or abutting points, shown in the lower part of Fig. 21, and the position of the pointer, with respect to the spindle which carries the circuit-wheel $k'$, is such that when it has just passed the first columns of words, on its way toward the abutting points, (or ribs) as these are called collectively, the large tooth $j'$, on the circuit-wheel $k'$, will be under the contact-brush $f'$. The coöperation of these parts is as follows: If the pointer is set at say the third word from the top of the fourth column, then the circuit-wheel will be in such position that four closures of the circuit by the brush will be made while the pointer rotates (in the direction opposite to that of the hands of a watch); the circuit-wheel being impelled by means of a suitable spring (of a character not necessary to set forth in detail), will rotate at an even speed, and thus the circuit closures will all be of approximately the same length, until that one is produced which is caused by the broader tooth $j'$; this will be longer, and any sounder or other receiving instrument at the receiving station, will indicate this fact, and thus inform an operator there that the pointer has passed over four columns. This locates the column containing the selected indication; the pointer and circuit-wheel continuing to rotate, as many more impulses will be made by the teeth upon the other side of the broad tooth as there are units of column-width between the beginning of the blank space which precedes the columns and that one of the abutting points which will engage with and stop the pointer; and these abutting points are so arranged that for every given indication in a column, beginning from the top, one additional tooth will be permitted to pass under the brush; in this way, (in the supposed case), after four impulses, showing the fourth column, and the pause, showing that the column spaces have finished signaling, three impulses will be given, showing that it is the third word from the top of that column which has been selected. The transmitter, as thus described, after it is set ready for operation, remains quiescent until, by reason of the energization of the magnet $e'$, by means of a current sent from a distant central station, its armature is attracted, thus freeing its pin $x''$ from engagement with the clock-work and permitting the circuit-wheel to rotate and transmit the signal as above described. This transmitter is inserted in the circuit in such fashion that the signal it gives is transmitted back to the station, which energizes magnet $e'$, and hence causes the transmitter to operate. The transmitter is incase or box $n'$ containing the telesemes is operating insulated points, may be readily connected to two corresponding, coöperating springs $w$, $w'$.

In Fig. 4 the magnet $R'''$ is designed to operate any suitable attention call, as for instance, a single-stroke gong of any desired variety, or a semaphore, or any other piece of apparatus not here necessary to set forth, as beyond its circuit connection it forms no part of this present invention.

*Local alarm.*—Near the beginning of the curve of the upper left-hand side of the drawing, will be noticed a black space with two pins marked $c'$, $c''$. These, coöperating with the springs $C'$, $C''$, shown in the upper part of the drawing, comprise consecutive breaks in a circuit devoted to the following purpose:—In order to enable anyone to send an alarm and yet to interpose certain checks, including the necessity for a more or less prolonged action which will enable passers-by to notice that he is doing this, the following provision is made: on the front door of the box (Fig. 3), is the disk $c^x$, bearing some suitable word, such as "Police call", and rotatable by means of knob $f^x$, and protected by flange $7^x$; this is ordinarily to be used by passers-by who have no key to the box, but desire to call for help and is shown in full inclusive of details which form no part of the present invention in said Patent 808,087. By means of a suitable shaft extending through the door, rotation of this disk rotates a mechanism within the box; this mechanism comprises suitable gearing, and includes parts not shown in Fig. 4 so as to avoid crowding the drawing, ending in a pin which closes the break at LA. By means of the apparatus described a certain amount of time must elapse before the citizen who has started to rotate the crank can close this break,—(this break, with its accompanying circuit-connections, is shown as $c'$, $c''$ at the left-hand, upper edge of Fig. 4). If there were no other break in the circuit, this closure would send the alarm; but for purposes mainly connected with the advantageous operation of the mechanism itself, it has been found to be desirable that a second break be introduced in series with the first. This second break is closed by means of button $K''$, on the outside of the door.

*Receiving devices.*—In addition to the various apparatus for transmitting signals from this station to the central station, the box includes various devices whereby signals may be received at the station, all of these being under control of the apparatus at the central station. These comprise, mainly, the sounder, or equivalent device, for receiving a variable signal transmitted from the central after the policeman or other operator has reached the street-box, and an attention call consisting of a gong, or an equivalent visual or semaphoric signal, acting to call the attention of a policeman in the neighborhood to the fact that extended communication is required with him, or in certain instances acting directly to inform him of various facts.

All of the emergency alarms and the notification alarm are produced by connecting together various circuits. The box is connected to the central station by an individual wire, usually having no other box upon it, and is furthermore connected by means of a return wire and a ground connection. The return wire may be one which leads directly to the central station, or it may be one which leads to a number of boxes and not directly to the central station. In either case it will serve as an alternative return, or completion for the circuit given by the ground branch. In my Patent No. 315027 I have shown how a latent signal transmitter is connected to a central station by one wire and two returns common to a number of such transmitters, the one return serving when the circuit is completed at the central station, for releasing the transmitter, and the other return serving to complete the circuit when it is closed at the transmitter station for the purpose of operating the notification. The present application may, as to this general feature, be considered the equivalent, with the substitution of a ground for one of the returns, and according to the local conditions of the service, it may be immaterial whether the gong magnet, teleseme, etc., in the street-box operate on the ground circuit, or on the metallic circuit, or whether, on the other hand, the notification and the various other alarms operate on the ground or the metallic return. As described, however, in connection with Fig. 4, it has been supposed that all the alarms from the street-box operate on the ground return.

*Circuits and manner of coöperation with*

*the central station.*—With the foregoing general explanation of the parts, the circuit details of Figs. 4 and 9 may now be understood. The individual wire 363 enters as shown in said figures. The return wire or the "collective return" branch 362 starts from the box at 26 and passes through a small strip of fusible metal (which is to burn out in case of lightning, accidental crosses with wires, etc.) to 33, down through the line 59 and there it divides into two branches; one branch going into contact $w$ and the other branch after passing through the gong magnet $R'''$ going to contact $w'$, said contacts being directly associated with the box $n'$ such as shown in Patent 573,591 or in Patent 808,087. These two contacts are arranged on a block firmly secured to the inclosing case and are so adjusted with reference to the remainder that when the case or box $n'$ containing the telesemes is screwed into place, corresponding contact terminals to a loop including the aforesaid magnet $e'$ and the contact breaker $f'$ will be brought into firm contact with spring ends of the beforementioned contacts $w$ and $w'$. A second wire runs up from $w'$ to the automatic contact maker $S''$, $S'''$. The earth wire $H'$ starts from $364^x$ and goes through sounder magnet S; and after it emerges from the said magnet at wire 46 it branches off at $46^x$, firstly to tap 45 leading to upper contact $C'$ of circuit-closer $K''$; a second branch 22 goes down to contact 2 of the notification button or lever K, marked also $l'$; a third branch $46'$ goes to contact terminal $I'$; a fourth branch 52 goes to upper contact $U''$ normally touching the lower contact $U'''$, thence by line 51 connected with this lower contact to upper contact $D''$. The individual wire in the present instance is shown as occupying the position of what in the more usual construction of circuits, at least as shown in the aforesaid Patent 808,087, constitutes the common or return wire, but the invention is not so limited. The individual wire 363 enters at 17 through a fusible strip to 18 and thence by binding screws through 19 to branch 20 which terminates at the key K; a second branch from the same plug 18 to 32 through 31, thence at $32'$ to the contact $D'''$ of key combination $K'^x$; but this branch divides at 32 and thence passes through another branch 47 to LA, the breaks of which are here shown as $c'$ and $c''$, and are supposed to remain closed until the door is opened. Starting in front of the break LA, from $c'$ a branch 48 goes to the contact $J'$ of the combination $K'''^x$, another branch $47'$ goes to the lower contact $G'''$ of the lever Q combination; while on the other side of the break from $c''$ a branch 43, 44 goes to the lower contact of the $K''$ combination; and another branch $43'$ goes to the contact $i$ of the push-button combination $K'''$. There are a number of additional circuits used for special purposes which will hereafter be described, but the circuits already described and which in a large measure are similar to the circuits in Patent 808,087 enable the following to be understood. The first or notification call is given by the button or lever K. This completes the circuit from the ground, through sounder S, 46, wire 22, to bottom contact 2, lever or button K and out through wire 20, etc. along the individual to an annunciator, such as 117 (Fig. 7) at central station, thus ringing a bell momentarily. In all substantial respects this circuit is present in said Patent 808,087 except that herein it is shown as grounded, while in said patent it is shown as a closed metallic circuit, and the direction of flow of the current is herein shown as the reverse of that in said patent. The second call is given when $K'$ is pushed, either by means of the key from the outside of the box as shown in said patent or by means of the lever Q as shown in said patent; and the circuit will be from the ground through sounder S, 46, wire 52, contacts $U''$ and $U'''$, contacts $G''$, $G'''$, wires $47'$ and 47, binding screw 17 and out as before. In the result produced, the said circuit is substantially the same as one of the circuits in the said patent, except that herein it goes through magnet S and sounder $F'$ and is shown as grounded, and also goes through LA (local alarm) while in the said patent it goes through a sounder somewhat similar to $K'^{xx}$ herein and is shown as metallic. As the current passes through magnet S, its armature is attracted, thus breaking the contact at $S'''$ and causing the other contact $S''$ to touch the terminal $I'$, thus establishing a new circuit as follows: from ground through S, $46'$, $I'$, $S''$, 54, $4'$, K, $2'$, 21, 20, 17 and out. In this case the lever K is of course off of the contact 2 and is in the position shown in full lines in Fig. 4, and in dotted lines in Fig. 9. This circuit it will be noticed, is formed by the attraction of the magnet S and will continue until the individual wire is broken at the central office, thus permitting the magnet S to release the armature and thus reëstablish the circuit conditions. It will be noticed that in the first named or notification call, although magnet S is also in circuit and also attracts its armature, this branch circuit through $I'$ is not made for the reason that the top contact of K is broken while the call is being given. The third call is given by means of a push-button or the like $K''$, and the circuit will be from the ground, through magnet S, 46, 45, $K''$, 44, LA (formed by closure between $c'$, $c''$ (the door of the box being closed), 47, 17, and out through the individual as before. The same effect will here be produced of a derived circuit around magnet S, thus continuing the closure until the central office has broken the individual line. An additional call is lettered K′ˣ, and is supposed to be given by the electromagnet 36′, the same being actuated through a local circuit loop into posts 35 and 41. Whenever this circuit is closed at some distant station, the armature D′ is attracted, momentarily closing the combination K′ˣ, thereby making circuit from the ground, through S, 46, 52, U″, U‴, 51, D″, D‴, 32, and out at 17. This circuit is rather similar to one of the circuits in aforesaid Patent 808,087, except that it goes through the magnet S and sounder F′ and is grounded, while in the said patent the circuit passes through a different sounder, and is shown as metallic. As before, the magnet S establishes the derived or continuity circuit. The call K‴ is here given by causing the magnet to attract its armature instead of by mechanically forcing the armature either close to the contact or into a possible magnetic field. When the button K‴ is pressed (the said button being preferably put on the outside of the box as shown in Figs. 1 and 2) and if the local alarm has before this been operated, the circuit will be as follows: from the ground through branch Y″, the magnet K′ˣˣ, wire 50, combination K‴, wire 43′, LA, c″, c′, 47, 31, 17, and out. The described circuit is comparable with a somewhat similar circuit in aforesaid patent, except that herein it is shown as going through auxiliary box Fig. 1, and through LA Figs. 4 and 9, while in said patent it goes through special contacts, shown on the large oblong black surface at the upper part of Fig. 3 therein, and is shown as metallic instead of grounded. Herein the current passes through the magnet K′ˣˣ and attracts its armature, thus establishing a shunt circuit about the button K‴. This circuit, which includes the combination K‴ˣ and the magnet K′ˣˣ, will continue after the circuit through K‴ is broken. The effect of this partial change of the path of the current is to produce the following difference in result between the break of the individual circuit at the central station in this instance, and in the instances already described, in which the current passes through the second switching magnet S (F′). When the latter is in circuit, this armature breaks the contacts between S″ and S‴; whereas, when the former magnet K′ˣˣ is in circuit, this is not done; and therefore in the latter case the current not only passes out, but a part of it passes through the other branch, by means of the binding post 19, thence to lines 20, 21, 2′, K (l′) 54, combination S″, S‴, 53, 55, through the transmitting teleseme, out through 57, 59 to 33 and 26, and thus into the tap of the common return wire; whether this return wire only goes to the central station, or whether it first goes to a number of boxes, as in the collective "return branch" system. Therefore, whereas, a rupture on the individual line after any of the contacts which energize magnet S (F′), will break the continuity of the circuit, and thus permit the armature of F′ to fall back to its original position; on the other hand, in case that the call has been given through K‴, and the magnet K′ˣˣ has been energized, the rupture of the individual circuit alone will not have this effect, as part of the circuit runs through the common return, (or by means of the common return taps to the top contacts of a number of other boxes in the system, these would act collectively to return all of the current to the central station through the individual wires of the other boxes, even if the particular individual line were broken by plugging into the line indicated by the annunciator); hence a continuously ringing bell at the central station will continue to ring until the ground wire at the central station, or the common return wire, as the case may be, is also broken, for example, by depressing the key 207′ shown in Fig. 7; thus clearly differentiating between K‴ and the other cases. It is also to be noticed that whereas, when any of the calls through SF′ were operated, the correct condition of the circuits would be indicated by the click of the armature of magnet S, this does not take place in the present instance, but a corresponding audible result is produced by the armature of magnet K′ˣˣ. In either case, instead of the click, there may be a visual attachment to this armature, like an annunciator drop, which may bear any suitable indication to show the correct operation. The same result as that reached by the button K‴ will be reached by turning the rock-shaft K‴ˣˣ, the outer end of which extends through the box, (or if desired merely through the protecting diaphragm,) and the inner end 62′, is so shaped that it will engage the member J′ (see Fig. 4) and mechanically close the combination K‴ˣ, thus producing the same result.

In describing the organization of the central stations the outside circuit arrangements will be more fully described; but enough has already been explained to show that, as to the box itself, the greater part of the connections would be applicable to any open circuit system. The local alarm apparatus will not be described here in detail, but it is to be understood that its function is primarily to enable anyone desiring to send an alarm to go to the box and by actuating a crank or some equivalent to cause a gong within the box to be sounded, electrically or mechanically, with sufficient force to attract the attention of the people in the neighborhood of the fact that someone is calling, and only subsequently to this operation to permit of the call reaching the central station.

*The auxiliary or sub-station call.*—Fig. 4 shows at the upper part how the magnet 36' is looped in a local circuit, at the other end of which there is a battery and circuit-closer. This circuit-closer is located at some convenient spot, as in a neighboring building, and is provided as an "auxiliary" device so that the street signaling box station may be used for sending an emergency call to central. Details of this arrangement are illustrated in Patent 808,087 referred to. The said circuit-closer as soon as operated energizes magnet 36' causing its armature to effect the closure of combination K'ˣ, and simultaneously permitting the fall of the hinged bar F'''', which fall at the same time reopens combination K'ˣ, and permits the contacts of combination 37 to fall apart and thus break the local circuit. If desired, this local break need not be produced, in which case, if a permanent circuit closer be at the sub-station, the armature D' will continue attracted, and the circuit will thus continue closed at combination K'ˣ, none of the means for opening it at the central station having any effect, and thus apprising the central station operator that a local alarm has been operated, or else that there is some abnormal operation of the box. By inserting, say at 51, either a simple rheotomic vibrator, or a circuit breaker which sends a definite characteristic, the central office will be enabled to differentiate that it is a sub-station call, and not an accidental closure which produces this continuous ringing.

Figs. 5 and 6 show further elevations, and the partial plan of the apparatus in part shown as M''''' of the lower left hand corner of Fig. 4. Its function is to notify whoever may open the door of the box (or perform any analogous act) whenever there is anything wrong in the circuit connections; thus enabling a constant open circuit system to signal a break in the lines, or any similar accident, in a manner almost automatic, and for many purposes as advantageous as that usually found beneficial in analogous closed circuit systems. Every time that the door is opened, the plunger M''''' behind the door is permitted to advance as far as it is pushed by its spring $p'''$, it being guided by the brackets 7'' and 7'''. In its normal position, the insulated block 7' is behind the end of the lower contact strip 6'', and the motion of the plunger is sufficient to cause the momentary passage of the block under the strip, raising the strip and permitting it again to move to its lower position, back of this block 7'; thus producing, during the movement of the plunger, a momentary closure between the contact springs 6'' and 6'''. If the circuit conditions are in good shape, as they pass through magnet Q' (only the corner being shown in Fig. 4 as in a box underneath the case holding the transmitter, and the magnet itself being supposed to be in a proper position to coöperate with its armature), the armature 6'''' will be attracted, otherwise it will remain mechanically in the same position by reason of the pin 6''''', which is blocked against plunger M''''' in every position of the latter, excepting when the slot *m* shown is brought into coincidence. The adjustments are such that such coincidence occurs only at the instant of the operation of the two contact springs; therefore, in case of any failure of correct operation of the circuits, the armature would not be, attracted at that moment, but would remain down and the pin 6''''' would enter the slot *m*, and thus permit either the bell hammer 69' to fall and to strike a bell 69'', and the visual disk 69''' to be suitably displayed, or any other desired effect produced, thus serving as an indication that something was wrong. If desired, this magnet may combine, partly or wholly, the function of either of the other magnets already described, as this magnet may easily be inserted, say at the upper end of the individual wire, whereby it will at all times be in circuit. If desired, the entire opening of the door, or the operation of any of the other circuit controllers, may for the time being cut this magnet out so as to reduce the circuit resistance.

*Additional detail of street-boxes.*—Fig. 3 gives an outer view of the inclosing case for the box, shown as above; K'' being the external push-button which operates the call heretofore described in connection with the local alarm LA, and LA being the crank disk of the said local alarm, and being turned by means of the projecting handle *fx*; the whole turning inside of the depression at 7ˣ. Among the new features, however, is the upper box 9ˣ shown in detail in Figs. 1 and 2, which contains the external push of K''', the differentiating call here called a "fire" call in contra-distinction to the "police" call given by K''. The point to be noticed is, firstly that these buttons are so placed that there is very little chance of mistake being made in their use; secondly, that the upper part K''' is so arranged that in manufacture it may be made separately from the rest as in Fig. 1, and may be added thereto at any time as in dotted lines, Fig. 3; although, of course, if preferred, the two boxes may be made integral in the first place. It will be noticed that the only necessary connection between the two boxes is by means of the wires 14ˣ, which represent the terminals, respectively, to the contacts *i. t.* of Fig. 4. This box may be, if desired, put on an additional post some distance from the main box. All these points are claimed as broadly new. In Fig. 2 the door containing the button is shown as open, and is seen edgewise; a suitable lock 15× being provided. An additional point in the present box is that one or more lower compartments 6× is either integrally joined to the box, or is so proportioned as to fit the same neatly. This compartment is meant as a letter box, and in case two are used, one preferably is arranged with a larger orifice 16× than the other 16×′ so as to permit of the reception of packages by persons depositing mail matter; or the door which the postman opens for collecting his mail is preferably connected with a circuit-changer corresponding to the combination of Figs. 5 and 6, or some equivalent thereto; thus greatly increasing the number of times per day that the circuit condition is automatically tested, thereby insuring a speedy report of trouble. If desired, this arrangement may be duplicated so that either the opening of the police or the letter box may produce the same effect. But it is to be understood that my invention is not limited to the combination of the circuit testing feature with a letter box, as a symmetrically arranged letter and signaling box, or signaling box with letter compartments or equivalents, will come within its scope.

*Central office organization.*—Fig. 7 shows the main features of the central office organization, where the "collective return" wire system, as referred to in connection with the box of Fig. 4 and a number of the previous modifications, is used. A number of boxes 361, Fig. 8, such as described particularly in Fig. 4, are placed around the precinct, each being supplied with a ground 364×, and an individual wire 363. In the alternate boxes shown, in order not to crowd the drawings with unnecessary lines, the individual wire is broken off. The collective wire, however, 362 or 362ª, it will be seen, joins a few boxes at a time, but has no direct branch to the central station; though, if desired, it may frequently be advantageous to connect certain sets directly with the central station. At the central station there is the annunciator and one or more switchboards such as the sending switchboard S° and the receiving switchboard R°, each individual wire running through a corresponding section of these, and ending at the annunciator wire 202, which wire leads around to the battery Lª, and thence branches off into several branches, one through the manually-operated key 364, another through 364ᵇ, one of the contact springs of an automatic gong ringer, which, operating in a manner analogous to the mechanisms used in fire-alarm repeaters, continues automatically to repeat any number designated by a characteristic wheel, marked 350, removably attached thereto; a third branch 364ª forms the lower contact of a transmitting teleseme, whose upper contact 365ª forms the "notification button". These coöperating contacts 365ª, the upper contact 365ᵇ on the repeater, and the lower contact of the key 364, in each case, by means of coöperating switch-plugs 354, 360, which plugs fit into one of the switchboards, correspond to extensions of the individual wires.

In the box it will be remembered the annunciator is called up by grounding the individual wire, and by referring to Figs. 7 and 9, it will be seen that the circuit would then be from local ground 364×, magnet S, wire 22, contact 2, lever or button K, wire 21, 20, through the individual wire 363, to the central station, and there through the switch-boards and the annunciator drop say 117, along wire 202, bell Dª, battery Jª and central station ground at 206. If the bell rang continuously, as it would in case any of the calls excepting the notification given by K had been sent, the operator could break the individual circuit by depressing key 207′; or, if one of the calls given through the other combinations described in connection with Figs. 4, 7 and 9 were received, (a part of the current, running through the individual), this circuit would be broken at the central station by inserting any of the plugs in the suitable jack of one of the switchboards. Conversely, if the central station operator wishes to call up one of the sub-stations by ringing the gong operated by the magnet R‴, Fig. 4, it is done by inserting any of the plugs in the desired switch and pressing the corresponding contact button, or duplicate circuit arrangement 364 or 364ª or 364ᵇ; in either case the circuit would be established by said plug or switch through the particular individual line chosen; thence in the box to the common wire contact 2′; thence along the return branch 59, 362 by means of the back contact 4′ of the double contact notification key (1′ or K of Fig. 4,) of every box of the set, and through all of these back contacts jointly or collectively; into the individual wires of all of those boxes; thence to the switchboard through all of those individual wires back by 202, 202ª, battery Lª. An additional call may be made by moving the switching lever of what is called the receiving switchobard R°. The plug 366′ shown in detail in Fig. 7ª′ has an inner and an outer skin 365ˢ and 366ˢ, respectively, one skin 365ˢ being connected to the cord 365, and the other skin 366ˢ being connected to the metal arm 365‴, or a second cord as an equivalent. Normally it will be seen that when a switching lever 365× is on the lower contact terminal of the cord extension 365″, and the upper arm of the switching lever is, by means of the wire 365′, connected to the arm, the plug, with its inner skin, and the connection shown, will together form a loop, and in no wise affect the circuit of the individual wire of a particular switch in which the plug happens to be resting; but if the switch-arm 365˟ is moved to the right, so as to touch the contact 357, it will be seen that the upper part of the individual wire, leading to the annunciator, is cut out, and the individual wire, after it reaches a contact spring of the spring and pin switch-plug combination, will make contact with the outer skin 366ˢ of the plug 366˟, thence the circuit will be through the arm 365‴, wire 365′, operating lever 365˟, terminal 357, thence through the relay magnet at 356˟, battery 358, and on as before. It will be seen that batteries 358 and L$^a$ might be combined, and one battery take the place of both, if it were not for the fact that the wires 202 and 202$^a$ are used at different times for the different purposes, and so it is economy to use two batteries; 358 being ordinarily used when it is desired to release a distant station instrument, with the additional series resistance of the relay 356′ in line; while battery L$^a$ is ordinarily used with the "multiple plug", to be referred to again hereafter. The function of this plug is to send current to a number of distant stations at once, so as to ring their gongs through their respective magnets, in this way requiring a much greater quantity of current. If desired, of course, the relay 356˟ and indicator, 355, and the sounder if desired in addition, or either of these, instead of being put in a local circuit controlled by the relay, may be put directly in the main circuit. The relative advantages of these plans, as well as the relative intensity and quantity of the respective batteries will vary according to the installation desired. If it is desired to set one of the teleseme transmitters 353′, so that the distant station may be able to release the same, in the manner of my Patent #289,834 herein above referred to, one of the corresponding plugs 354 is connected with the desired individual terminal on the board R° and thereupon, when the operator at the box presses his button, a circuit will be made from the ground 364˟, to the box, to the individual, thence to the plug of the chosen teleseme, through top contact key 353 into the teleseme; along line 354′ to battery 206ᶜ, thence to ground 206ᵃ. An alternative circuit might be made by discarding the said battery and ground, and connecting the line 354′ to line 202; in which case the battery used would be J$^a$, and the ground would be 206. In this case, of course, the bell D$^a$ "notifies" operator that a distant station has released its apparatus. In some cases this is preferable to having the notification limited to the noise made by the particular teleseme 353′ used.

The "multiple-plug" referred to above is shown as 352 of Fig. 7, and as M, P, of Fig. 11. Its object is to enable the central operator to connect, as one act, his signal key or transmitting apparatus with a number of individual lines. It may be made in various forms, and essentially comprises sockets or holders 386 for the several plugs MP″, and as shown in connection with the repeater 350 of Fig. 11, it serves the further purpose of enabling one of the connected boxes to stop the repeater, the number of said plugs corresponding with the number of boxes. The repeater is controlled by means of a clockwork, in its turn controlled by a magnet. This magnet is looped in between the outer and inner skins of the plug MP′, which skins are similar to those shown in Fig. 7$^a$, and when this plug is inserted in the hole corresponding to a street box, the surrounding plugs MP″, here shown as shorter, will connect with surrounding boxes, it being understood that the relative location of the boxes on the street corresponds to the relative location of the holes in the switchboard connecting with the respective boxes. In the organization shown it is designed that the number characteristic of the box connecting with the central pin, be rung out by the repeater on the gongs of the surrounding boxes, by means of the break-wheel and coöperating brushes 364$^b$, and that when the object of this alarm has been fulfilled, a circuit closure through any of the emergency calls, sent from the box connected with the central plug MP′, may cause the magnet controlling the repeater to stop its operation. To this point there has been described a system which in a general way is similar to and as to many of its details is identical with the system shown in Patent 808,087 in which only one central coöperates with a number of out-lying street boxes. I shall now describe how in large organizations of similar systems and coöperating parts I bring about a coöperation between two or more of such systems, each having some boxes adapted to connect only with one central station and some boxes adapted to coöperate in addition to a varying degree of completeness with a second central station.

*Coöperating central stations.*—Fig. 10 represents one of the manners in which two of a number of precincts are connected together, each precinct having a number of radiating lines to the different boxes in its precinct, and each precinct being, moreover, connected by a circuit to the central station of every other, or as many as may be desired, adjacent precincts. These lines are shown as heavy lines. Fig. 10, moreover, shows how, if a return wire is used, this wire is arranged so that it has a number of taps or branches. In this manner it will be seen that the return wire may be broken in several places on the main circuit without affecting any of the boxes, and if broken on one of the taps, no harmful effect will result even to the boxes connected to the severed tap, unless these do not exceed two or three in number, because if they do, they can be made to operate on the "collective return" principle. The wavy lines represent additional return wires to the central station, thus greatly increasing the safety of the system, as if several of these are added. no boxes could entirely be cut out, unless all of these coöperating branches were also broken, as any one of them would serve as the return. These wires need not be confined exclusively to this purpose, but may serve additional useful purposes in the system, or may serve entirely separate commercial purposes. Under description of Figs. 14, 15, 16, 17, additional variations in the precinct wiring system, as well as in the coöperation of two stations, will be shown. This coöperation of the two precincts may be either entirely automatic, or requiring, in part or entirely, some work from the central station operator.

I shall first explain the first organization where it is practically entirely automatic. This is shown in Figs. 12 and 13, representing the central station of two precincts, as in Fig. 10. The circles 117, 118, 119 and 120 (see also Fig. 7) represent drops of any improved construction, each at the end of an individual wire, with a box at the other end, irrespective of the character of the box used thereon. Circles $B^a$ show graphically what is shown more in detail as $B^{ax}$. This consists of an annunciator drop, connected to the end of individual wires, the boxes at whose other end are on the border lines between the two precincts referred to. Only so much of the operation will be explained as is pertinent to this coöperation of two stations: As soon as one of the "border" boxes is operated, the current enters through the individual, goes through drop $B^{ax}$ of station $A'$, Fig. 12, into 128, ringing a local bell $A''$, thence to a circuit-changing drop $F^a$, and around by wire 203 to battery $L^a$ out to return wire 123. (Of course, if the collective branch system was used, an earth would be substituted at the end of battery $L^a$.) As this current passes, both the individual drop $B^{ax}$ and $F^a$ are energized thereby, and each of them is constructed to let a drop bar or equivalent close the contacts of the circuit closer 200 and $E^a$ respectively. The closing of the contacts at 200 and the movement of the middle contact of $E^a$ to the lower contact make the following circuit: ground, 206, 114, $K^a$, 116, 202', 114', local bell $C^a$, lower contact of $E^a$, middle contact of $E^a$, and along line 207 to the next station $B'$, Fig. 13, where it will pass through the upper contact of $E'^a$, middle contact of $E'^a$ and then through the alarm gong $205^x$ to ground $206^a$. The corresponding operation at Fig. 13 would produce the same effect at Fig. 12.

The drops $B^{ax}$ are supposed to be restored at the same time, and serve merely to indicate to the receiver, at Fig. 12, which of the border boxes has called; their restoration, however, does not restore $E^a$, as this is separately mounted, and continues until it is specially stopped; in this way confusion due to a multiplicity of simultaneous signals is minimized. The ordinary calls are received along wire 202, "notification bell" $D^a$, (see also Fig. 7), relay $G^a$, closing its local circuit $J^a$, 203 and out through 123.

The second manner referred to for calling the attention of a coöperating station to any desired fact, especially the fact that a box, lying on a border between two stations or districts, has been operated, requires more work on the part of the operator. This is shown in Fig. 11. A special annunciator board, or a section of the main board, or a multiple pen register, or any analogous device, has one or more sections devoted to this purpose. Supposing station of Fig. 10 sends, either automatically, as above described, or by the aid of the operator, as will be described immediately hereafter, a signal as an alarm merely, or operates by means of the repeater to send the characteristic of the particular border box which has been operated; the current will come into the station through 207, as described in Fig. 13, and instead of going merely into $205^x$, which is there shown as generically a vibrating gong, or any other kind of receiving apparatus, and is here shown as an automatic circuit-breaker, it will in addition pass through a drop 373, thus indicating which one of several of such lines 207 has been operated. As it passes through, the current will cause magnet 373 to display its drop, and at the same time permit circuit-closer $205^x$ to attract its armature, thus breaking the ground at contact $205^{x'}$, and immediately establishing a shunt around the magnet 373, by means of line 376, into gong or register 380, thence again to ground. 380 will then indicate whatever is indicated by the finger key, worked by the operator at the distant station, or by the automatic repeater. Conversely, the central office operator, if he wishes to transmit a like characteristic to another station, puts the correct wheel 350 on his repeater, inserts the multiple plug MP so that the long center pin MP' falls into the correct pin hole of the switchboard 383, that is, the pin hole corresponding to the box, the characteristic number of which is to be transmitted, thereby causing all the other pins to fall into the coöperating places. One of these will fall into the hole corresponding to the terminal of 207 of the central station of the adjacent precinct. As soon as this is done, the current will be established from ground, 378, through 382 (the gong or equivalent 380 may, or may not, be included, as it is or is not desired to have a check upon the operation), battery 388, contact brushes of the repeater, multiple plug and out, simultaneously to the coöperating boxes of the precinct, and through the precinct connecting line to the station house of the adjacent precinct as herein-above pointed out the transmission by the repeater may be stopped by the box connected with the central plug MP'.

It is to be observed that a precinct might be so organized that there would be a larger number of boxes on the border between two precincts than it would have on one of the sides of the square or other shaped multiple plug; in this case an additional separate plug, of the series 360 of Fig. 7, might be inserted, and would, of course, operate simultaneously with the other plugs of the cluster MP of Fig. 11; or, if desired, (and it is often preferable, and is a part of the present invention), the switch pin corresponding to the desired border terminal may be repeated at intervals along the proper edge of the switchboard to any other suitable part thereof; as here shown by the dark holes, in the upper row.

In describing Fig. 10, some explanation has been given of the way the two stations coöperate. This manner will, for the purposes of this application, be considered as representative, while the following Figs. 14 to 17 inclusive show another character of coöperation. In Figs. 14 and 15 it will be noticed that the boxes are so arranged along the street (irrespective as to which side of the street they are on), that all the boxes between two precincts do not connect to the same precinct. In Fig. 16 some or all of the border boxes are provided with two individual lines; in these, all the parts may be fully duplicated, or else simply the alarm mechanism to give the alarms may be duplicated; or the individual wire may branch to the two stations, in which case the operation at each station would be the same; but in case of a notification call, this would be attended to by one or the other of the stations merely according to some predetermined order, while in case of an emergency call, both stations would pay attention. In Fig. 17 it will be seen there are two boxes, one on each side of the street, or at all events practically on the border line, although a street or so may intervene; and these are connected together by an individual line 394, which passes through both boxes, while the other individual line 397 also passes through both boxes. Such a connection may be made, for example, by connecting the "individual" posts of the two boxes and by connecting the "return" posts to a common return wire or to a collective return wire, thus splitting each individual line into two branches having substantially equal resistance. From certain points this amounts to but a single connection between the two boxes, but for other purposes important modifications are introduced. In 396' there is but a single connecting line, that is, the individual wire practically extends from station to station, taking in these two in series; while in 397 the two boxes are shown connected together by a ground wire, there being no separate ground at each box. In this way it is easy to cut off the ground whenever the notification is operated. In Fig. 17 the two central stations are shown to be connected also by a direct line 399. It is to be noticed in this sheet of drawings, as well as those of Fig. 10, that the grounds are not shown, in order to simplify the drawings, it being supposed that there is a ground at each box. It is further to be noticed that this arrangement of coöperative border boxes may be used not merely for enabling boxes to signal to either or both stations, but also to enable either of the central stations to operate the border boxes, and thus communicate with the policeman on the borders of the next precinct. This is very important in cities where there is often the strictest discipline in what emergencies the policeman may leave either his beat or his precinct. It is to be observed that wherever the word precinct is used, a beat or patrol might be substituted; and there are many commercial and analogous uses to which the organization is applicable. In several of the figures, the wavy lines 391, 393, 387, it will be noticed, form the safety lines already alluded to; the special importance of their location as here shown will not be explained at length, as it is obviously dictated by the special necessities of each place, as to the likelihood of breakages occurring there, etc.

*Circuit controller $G^a$ at central.*—Fig. 18 represents the front view, 19 a side view, and 20, a view of a detail of the circuit controller $G^a$ in Fig. 12. As soon as the electro-magnet A at $G^a$ is energized, it attracts its armature E'', thereby permitting the weighted arm A' fulcrumed at B, to move the shaft, carrying with it the segment B', and being retarded by the 'scape wheel and verge D' until the arm reaches its lowest position. At the same time either the arm directly, or the bell hammer J, fastened to the armature, may be made to strike the bell E to call attention. On the same shaft B is mounted a rod F'', preferably fitted with an insulated block I. Two contact springs, not shown herein, are closed or opened, as the case may be, by the movement of I; or, for that matter of any of the other parts brought into operation. The purpose of this is to retard the local control of the circuit, an instant or so after the magnet has been energized. Suitably pivoted is the restoring arm M'ˣ, the point of which, when pulled down, strikes a projection, preferably J'. As it is pulled down, either because it is itself a spring, or because its end is pivoted to have motion one way, and is kept in proper position by the leaf spring Mˣ, its end will pass over the projection J', and then, under the force of the spring Kˣ, it is pulled into position again, the point of the restoring arm acting to raise J' again, and thus again lift up E' to its original position. As E' is lifted, it passes under the end of the armature, lifting this, and passes beyond it to a sufficient degree to cause the armature to rest on its upper end whereupon the weight A' is ready to be tripped again. The restoring arm is preferably operated by means of the rod I'', pivoted in the suitable one of a number of holes, so as to admit of the proper adjustment, according to the coöperating apparatus. The other end, not shown, of this arm is supposed to be attached to either the annunciator restoring handle, or the operating lever of the switchboard, or any other part of the mechanism which is brought into operation after the action of the device, being described, has apprised the operator that something is to be done by him. Of course, very many modifications can be made in the precise mechanism as shown, without departing from the spirit of my invention. Some of the details of the operation are the sole invention of Charles Herrmann, and hence are not claimed herein, but are claimed in an application by him. This mechanism can be used in connection with other apparatus of widely varying character, and especially is it of importance in connection with apparatus shown in many of the applications of Herzog, in which the main circuit itself is broken at the instant of operation at a distant station, it having been found that it frequently happens that the circuit is broken too quickly, and hence interferes with the proper operation of the apparatus at the central station; in the present instance it will be seen that the time to elapse between the energization of the apparatus and the breaking of the circuit may be regulated. Of course it is a matter of detail whether the circuit be opened or closed by this action, and whether it be a main circuit or a local circuit.

The various points described, which are not found in other pending applications of myself, or either of the parties named above, I consider broadly new, and they may be widely varied in construction, connection and use without departing from the spirit of my invention.

What I claim is:

1. In a signaling system, two or more central stations; each comprising suitable apparatus connected to circuit controlling apparatus at various outlying stations, a limited number of such outlying stations connected to both of the central stations, and circuits arranged in multiple acting as such connections, substantially as described.

2. In a signaling system, two or more central stations; each comprising suitable apparatus connected to circuit controlling apparatus at various outlying stations, a certain number of the outlying stations being constructed to produce a variety of effects at a central station and being connected to both of the central stations, as to some of their effects merely, and circuits arranged in multiple acting as such connections, substantially as described.

3. In the central station of a signaling system, a series of indicating devices corresponding to various outlying stations connected to the said central station only; together with another series of indicating devices connected with outlying stations which are also connected to a second central station, substantially as described.

4. Two or more central stations connected by a special circuit, the said stations being also connected through two or more intermediate signaling station circuits, substantially as described.

5. In a signaling system, two or more central stations each having street boxes connected thereto, and at one of said central stations circuit connections and controllers constructed and arranged to operate any desired street box of the system connected with said central station and, simultaneously, one or more boxes connected to another station.

6. In a signaling system, a central station, a number of outlying stations each connected to said central station, another central station, and a lesser number of outlying stations connected to both of said central stations, said connections to said first mentioned central station being constructed and arranged for simultaneous coöperation.

7. In a signaling system, a central station, outlying stations, circuit connections between said central station and said outlying stations, the connections to some of the outlying stations differing from those to others, and a circuit-controller at the central station constructed to control simultaneously mechanism located at each of any desired combination of said outlying stations.

8. In a signaling system, a receiving station, a plurality of transmitting stations each having an individual connection to said receiving station and each comprising a plurality of circuit-controllers, a common alarm for said individual connections and an annunciator for each, and circuit connections whereby the operator at the receiving station may determine by changing the alarm-operating circuit which controller at any transmitting station has been operated.

9. In a signaling system, a central station, a plurality of interconnected sub-stations, a single wire from each sub-station to said central station, a common alarm at said central station for said sub-stations, a plurality of circuit-controllers at each sub-station, and circuit connections arranged to be so established by said circuit-controllers that the central station operator may determine by a change in the alarm-operating circuit which of the circuit-controllers at any sub-station has ben operated.

10. In signaling apparatus, the armature of an electro-magnet, coöperating with contact points, to act as a top or bottom contact key, or two-ways switch; means for causing it to coöperate with the abnormal contact, means independent of said aforementioned means for maintaining the abnormal condition, and devices at a second station whereby the normal condition is restored; substantially as described.

11. In a signaling apparatus placed at one station, of a system comprising a main circuit between two stations, and a return other than an earth, a circuit-controller operated at the first-named station, and continuing to maintain the resultant circuit conditions until a break occurs in the circuit at the second station, substantially as described.

12. In a signaling apparatus placed at one station, of a system comprising a main circuit between two stations, and a return other than an earth; two or more circuit-controllers operated at the first-named station, and continuing to maintain the resultant circuit conditions until changes are made in the circuit conditions at the second station, such changes differing for the two circuit-controllers, substantially as described.

13. At a transmitting station two or more circuit-controllers, each comprising the armature of an electro-magnet, means for changing the position of rest of the respective armatures, so that the resultant circuit conditions will continue the armatures in their respective resultant positions, and devices at a second station whereby the normal position of one of the armatures may be restored before that of the other, together with certain conditions enabling the central office to discover which of the two controllers has been operated, substantially as described.

14. In a system comprising a central station with two or more outlying stations, each containing apparatus for receiving as well as for transmitting signals, together with two or more circuits extending from the central station to two or more of the outlying stations which are not in series, circuit conditions whereby one of said wires acts as a whole or partial return for the current sent out on the other wire from the central station, substantially as described.

15. In a system comprising a central station, a number of sub-stations, each comprising receiving and transmitting apparatus, separate lines comprising individual wires from the central station to a number of the sub-stations, together with circuit conditions whereby a circuit passing through one of the individual wires returns through two or more of the others collectively, substantially as described.

16. In a signaling system, a central station and outlying stations each comprising receiving and transmitting apparatus, an individual wire running from the central station to a plurality of the outlying stations, a common return, and circuit connections between two or more of said outlying stations comprising a group.

17. In a signaling system, a central station and outlying stations each comprising receiving and transmitting apparatus, and an individual wire running from the central station to a plurality of the outlying stations, a common return, groups of two or more of said outlying stations having circuit connections between the members of each group, one of such groups having an additional return to the central station.

18. An operative circuit system comprising a central station, two or more outlying stations, a separate circuit to each of the outlying stations, an earth branch at each of the said sub-stations, and a separate connecting wire between two or more of the said stations.

19. An operative circuit system comprising a central station, two or more outlying stations, a separate circuit to each of the outlying stations, an earth branch at each of the said sub-stations, and a separate connecting wire between two or more of the said stations, said wire not extending to the central station, and at the sub-station two or more circuit-controllers, and at the central station means for breaking either of the circuits, together with circuit conditions whereby the respective breaks coöperate with the respective circuit closers at the distant stations, substantially as described.

20. In a signaling system, two connected stations, means at one of said stations for signaling the other by establishing one or the other of two abnormal circuit conditions in the connections between said stations, and signal differentiating means at the other station comprising circuit breakers so arranged that the signals thus sent may be distinguished by interrupting one or the other of the abnormal circuit conditions thus established.

21. In a signaling system, comprising a central station and one or more sub-stations each connected to the central station by two or more circuits comprising a plurality of returns, two or more circuit-controllers at the sub-station, mechanism for causing these when operated to continue in the resultant condition until subsequent operation at the central station, and mechanism at the central station arranged to determine which of the distant circuit-controllers has been operated according to which of the return circuits has been controlled at the central station.

22. In an electric signaling system, two connected stations, a manually-operated circuit-controller at one of the stations constructed to effect by a single manual manipulation a signal transmitting change in the circuit through said stations, and means at the other station for determining whether the said controller has been operated, comprising means whereby a plurality of coexisting breaks in the signal transmitting circuit established by said controller effects such determination.

23. At a central station, apparatus comprising circuit connections to a number of sub-stations, and one or more circuit connections to a second substantially similar central station, together with means for simultaneously controlling some of the sub-stations of each of the two central stations, substantially as described.

Signed Nov. 2, 1907.

F. BENEDICT HERZOG.

Witnesses:
   THEO. THOLENAN,
   A. P. BUCKSTUHL.

Copies of this patent may be obtained for five cents each, by addressing the "Commissioner of Patents, Washington, D. C."

It is hereby certified that in Letters Patent No. 1,154,184, granted September 21, 1915, upon the application of Felix Benedict Herzog, of New York, N. Y., for an improvement in "Electric Signaling Apparatus," errors appear in the printed specification requiring correction as follows: Page 3, strike out the sentence commencing with the words "The transmitter," included in lines 20–24, and insert the following sentence: *The transmitter is inclosed in a box n', and by means of two coöperating insulated points, may be readily connected to two corresponding coöperating springs w, w'.;* same page, line 45, for the reference-letter "$c^{x}$" read $e^{x}$; page 7, line 109, for the reference-numeral "1'" read *l'*; same page, line 117, for the reference-numerals "366'" read *366$^{x}$*; page 8, line 23, for the reference-numerals "356'" read *356$^{x}$*; page 12, line 15, claim 9, for the word "ben" read *been;* and that the said Letters Patent should be read with these corrections therein that the same may conform to the record of the case in the Patent Office.

Signed and sealed this 5th day of October, A. D., 1915.

[SEAL.]

R. F. WHITEHEAD,
*Acting Commissioner of Patents.*